March 15, 1949.  E. H. VANDERWALL  2,464,359
LATHE CENTER
Filed April 5, 1946
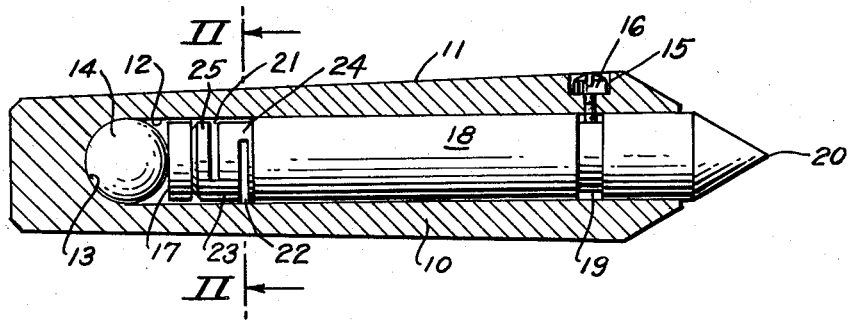
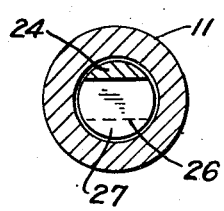 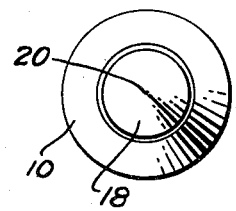
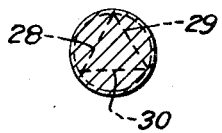 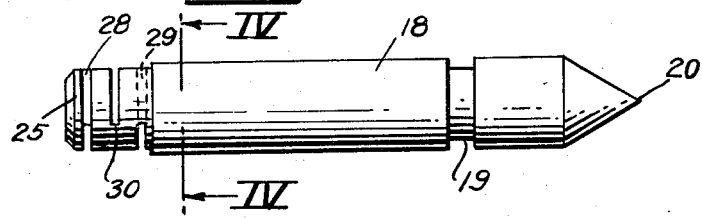
INVENTOR.
ERNEST H. VANDERWALL
BY
ATTORNEY Patented Mar. 15, 1949

2,464,359

UNITED STATES PATENT OFFICE 2,464,359

LATHE CENTER

Ernest H. Vanderwall, Oakland, Calif.

Application April 5, 1946, Serial No. 660,006

2 Claims. (Cl. 82—33)

My invention relates to improvements in a lathe center.

One of the objects of my invention is to provide a lathe center having a rotating spindle in which provision is made for compensating for the expansion of the work piece due to heat generated in it as the cutting tool is used.

Another object of my invention is to provide means for assuring the free rotation of the spindle under all conditions of endwise pressure.

Another object of my invention is to provide a novel means for allowing for endwise movement of the rotating spindle portion in the housing.

Another object of my invention is to provide a novel means for securing the spindle in place and also for removing the spindle from its housing when it is desired to substitute a spindle having a female instead of a male end.

A preferred embodiment of my invention is shown in the drawings in which—

Fig. 1 is a longitudinal cross-sectional view;

Fig. 2 is a cross-sectional view taken on the line II—II of Fig. 1 in the direction of the arrows;

Fig. 3 is an end view taken from the right hand end of Fig. 1;

Fig. 4 is a cross-sectional view taken on the line IV—IV of Fig. 5; and

Fig. 5 is a plan view of a modified form of spindle insert.

It is not my intention to limit this invention to the details of this disclosure except as required by the appended claims because different manufacturers may prefer to make variations in the structure and yet come within those claims.

The device includes an outer shell 10 which has its surface 11 tapered, usually to the Morse taper, to fit in the spindle in the headstock or in the tailstock of a lathe. This shell 10 has a bore 12 usually with a straight cut which extends substantially to its bottom end where at 13 its end is rounded so as to receive a ball 14 to provide a hard and yet relatively frictionless surface against which the spindle will be thrust.

In place of the ball 14, I may on certain types of installations substitute a thrust bearing usually of the ballbearing type, using much smaller balls than the balls shown at 14. In this case the end 13 will be flat or have a shoulder to receive the thrust bearing.

The shell at 15 has a recess and a counter-sink in which is threaded a screw 16 the purpose of which is to hold the spindle 18 in the shell. It also has other functions, namely, for oiling when the screw 16 is removed and also to permit an air-jet nozzle to be applied to the recess 14 so the air will blow the spindle out of the shell. This latter avoids the necessity of having a hole in the back end of the shell and enables the easy removal of the spindle where it is desired to insert another spindle in its place.

It is not absolutely necessary but I have found it advisable to have a thrust washer 17 bearing against the thrust ball 14 where that type of ball is used.

The spindle 18 is made to form a snug rotating fit with the bore 12 of the shell. It also has an annular groove 19 which is axially wider than the diameter of the screw 16 so as to allow a reasonable axial movement of the spindle 18 with relation to the shell 10. The reason for this is to allow for the expansion of the work being supported by the point 20 of the spindle and to allow the spindle 18 to move axially to the left as the work (to the right of the point 20) expands and exerts additional pressure on the spindle 18.

The compensation for this axial movement of the spindle 18 to the left is provided for in the two reverse cuts 21 and 22 near the end 23 of the spindle 18. The nature of these reverse cuts is shown more clearly in Fig. 2 which is a cross-sectional view taken on the line II—II of Fig. 1. The shaded portion 24 at the top is the portion which connects the end 25 of the spindle 18 with the main body portion of the spindle. The portion lying below the dotted line 26 in Fig. 2 and marked 27 is similarly shown on the spindle 18 in Fig. 1. By means of these cuts made from opposite sides of the spindle 18 the end portion 25 is moveable axially with respect to the main portion of the spindle 18 and provides a spring or resilient cushion effect so that the distance from the point 20 to the end 25 can be reduced as the work supported on the spindle expands due to heat or other reasons. Stated differently, the cut or cuts partway across the spindle 18 provide a portion of the spindle stock which is unsupported with relation to the its axially adjacent area.

While I have shown in Fig. 2 and Fig. 1 two of these cuts 21 and 22, made from opposite sides of the spindle 18, it is possible to have several of these cuts or to have them come in from different angles. For example in Figs. 4 and 5 I have shown a spindle 18 having three cuts from opposite sides of the spindle nearest the face 25. For example, the cut at 28 on Fig. 4 is the cut at 28 on Fig. 5. The solid portion 29 on Fig. 4 is the solid portion 29 on Fig. 5 and the solid portion 30 on Fig. 4 is the solid portion 30 on Fig. 5.

While I have referred to this device as used in a lathe, it also has use in drill presses or other machines where a center is needed.

What I claim is:

1. A compensating center including an outer shell having a bore extending axially therein, a single spherical thrust bearing seated against a closure in said bore, a wear plate engaging said bearing, a spindle fitted in said bore in rotative relation thereto so that said bore serves as a bearing for substantially the full length of said spindle, an annular groove formed intermediate the ends of said spindle, a pin threaded through said shell and extending into said groove, said groove having a greater axial dimension than said pin, and a plurality of radially extending cuts crossing the axis of said spindle to provide a resilient means between said plate and the outer end of said spindle as the same supports a workpiece.

2. A compensating center including an outer shell having a bore extending axially therein, means forming a thrust bearing seated against a closure in said bore, a spindle fitted in said bore in rotative relation thereto so that said bore serves as a bearing for substantially the full length of said spindle, means to rotatively retain said spindle in said bore, and a plurality of radially extending cuts crossing the axis of said spindle to provide a resilient means between said bearing means and the outer end of said spindle as the same supports a workpiece.

ERNEST H. VANDERWALL.

REFERENCES CITED

The following references are of record in the file of this patent:

UNITED STATES PATENTS

| Number | Name | Date |
|---|---|---|
| 960,678 | McIntyre | June 7, 1910 |
| 1,653,899 | Goff | Dec. 27, 1927 |
| 1,747,385 | Olson | Feb. 18, 1930 |
| 1,742,451 | Schnelle | June 7, 1930 |